Patented Mar. 16, 1948

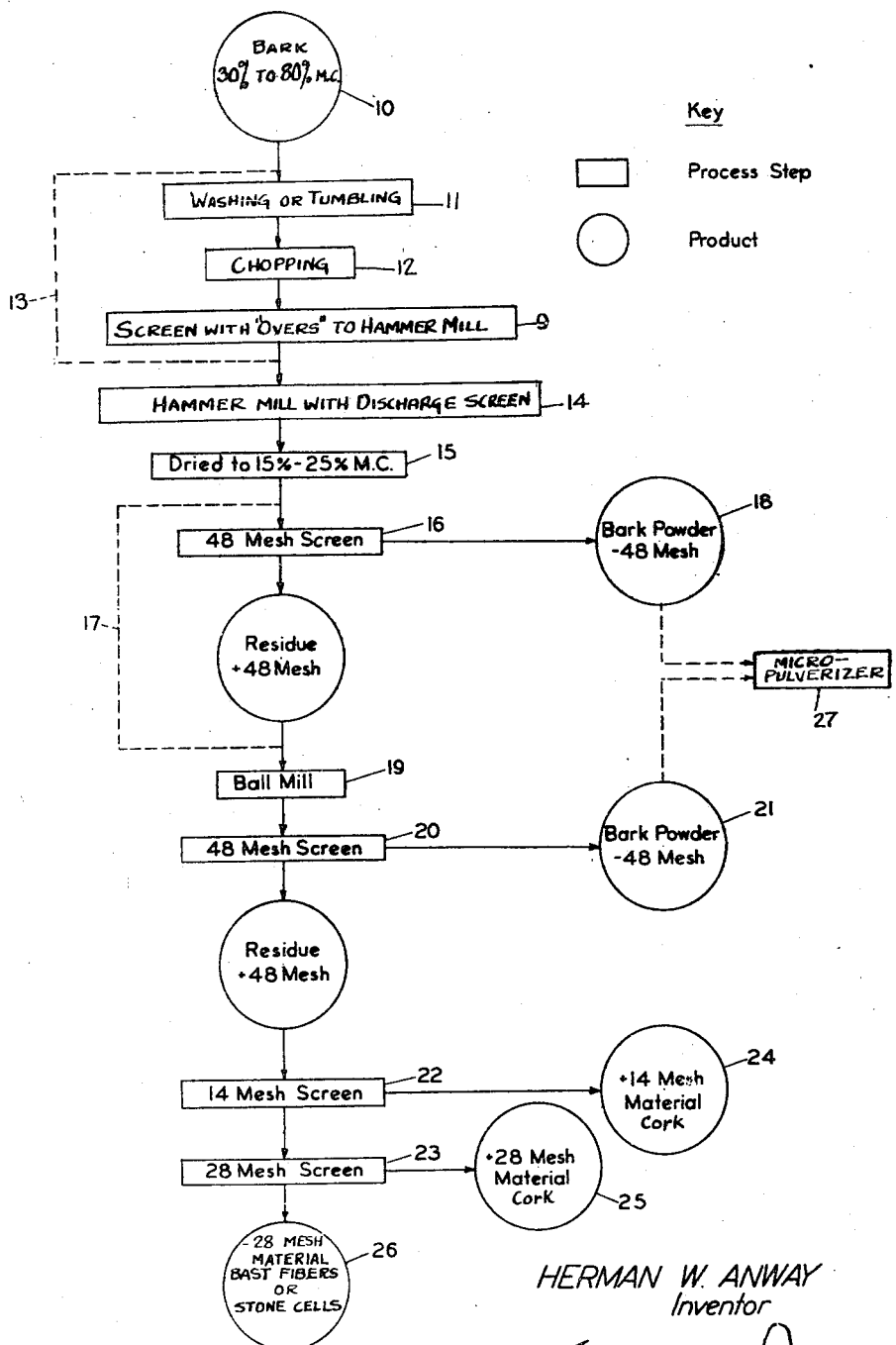

2,437,672

UNITED STATES PATENT OFFICE 2,437,672

METHOD OF TREATING BARK

Herman W. Anway, Cloquet, Minn., assignor to Weyerhaeuser Timber Company, Longview, Wash., a corporation of Washington Application September 27, 1944, Serial No. 556,097

6 Claims. (Cl. 241—14)

This invention relates to the treatment of bark, and has particular reference to a method of treating bark for recovering therefrom a plurality of bark fractions having requisite purity for commercial use.

In general, the barks of trees comprise periderm, phellem or cork, and phloem which consists of a collection of sieve tubes and parenchyma, and frequently bast fibers or stone cells. Pieces of bark from separate trees show a wide variation of relative amounts of cork and phloem, grading from pieces consisting almost entirely of phloem and having but thin lunes of cork, to those consisting of large masses of cork or phelloderm with small islands of phloem existing in the cork. Microscopically, the phellem or cork is composed of layers of non-elongated suberized cells partially filled with air and of low specific gravity. The constituents of the phloem are longitudinal cells comprising sieve tubes, frequently bast fibers or stone cells, phloem parenchyma, and radial cells comprising ray parenchyma.

The invention is predicated upon the discovery that by adjusting the friability of a bark matrix, a suitable comminuting process (as ball milling) may be employed to differentially pulverize the constituents of the mark to break the bond therebetween and so permit separation thereof by selective screening. The invention is productive of various classes of materials, each of which may be recovered substantially free from mixture or contamination.

The first of these materials is the phellem or cork developed each year by the phellogen or cork cambium. The phellem or cork consists of non-elongated thin and thick walled cells converted into cork tissue by development of suberin. The thin walled cells probably are not heavily suberized and tend to collapse in the radial direction. The cork cells are partially filled with air and are of low specific gravity.

The second class of materials to be found in certain barks, Douglas fir in particular, comprises a tough fibrous portion of the phloem known as bast fiber. This material is resistant to destruction by milling processes and is recovered in the form of individual hard fibers. For purposes of the instant disclosure, this material is referred to as bark fiber, and largely comprises the intermediate fraction between the cork fraction and the bark powder fraction. At low moisture content these fibers tend to maintain their identity, even when subjected to the severe pulverizing action by which other portions of the phloem are reduced to powder.

A third class of materials is that herein classified as bark powder, being composed initially of sieve tubes and other portions of the phloem exclusive of the bast fibers. This material readily disintegrates under the action of a ball mill at a moisture content at which the cork and bark fiber fractions are highly resistant to disintegration. A chemical analysis of the bark powder discloses that it comprises lignin in major proportion.

The lignin in the bark is a naturally occurring lignin having excellent properties of flowability and of plasticity. It is believed that these properties are present by reason of the fact that the bark powder has had none of the treatments by which lignin is prepared from wood by known commercial processes, and so is unaltered by the severe chemical treatments generally employed to produce lignin or lignin-enriched extenders. Moreover, the bark powder contains ether soluble bodies of wax-like material which, in their natural state, impart flowability under hot compression and water resistance to a hot molded product comprising the bark powder as a principal ingredient. By reason of these properties, the bark powder is plastic in character and is especially adapted for use as the principal ingredient of molding compounds for the manufacture of plastics.

In the practice of the invention, bark may be stripped from logs and chopped or otherwise broken up to facilitate feeding the bark to a hammer mill or other suitable grinding equipment for converting the bark into a substantially uniform mass of bark particles. The purpose of this step is to so reduce the particle size of the bark as to provide for control of its moisture content in a continuous process of producing the several bark fractions. It is recommended that the moisture content of the bark to be ground be from 30% to 80%, based on the weight of the dry bark. After the grinding step the moisture content of the ground bark is adjusted to enhance destruction of the bond between the several bark constituents by comminution, and so permit separation thereof by selective screening.

It is, therefore, the principal object of the invention to provide a method of treating bark for recovering therefrom a plurality of bark fractions having requisite purity of separation for commercial use.

It is a further object of the invention to provide a method of treating bark for recovering therefrom bark powder comprising potentially reactive lignin in major proportion.

It is a further object of the invention to provide a method of treating bark for recovering therefrom bark fractions comprising cork, bast fibers or stone cells, and bark powder as separate fractions.

It is a further object of the invention to provide a method of producing commercially useful bark fractions by controlling the friability of the bark throughout a plurality of comminuting steps.

For purposes of the instant invention, the bark may be stripped from logs, the stripping preferably being accomplished soon after the trees are cut and before evaporation of the sap from the logs causes the bark to become cemented tightly to the wood. Since it is preferred that the moisture content of the bark to be ground be from 30% to 80%, based on the weight of the dry bark, the bark may be used as stripped from the logs taken from a mill pond without any adjustment in its moisture content.

The bark removed from logs may contain rotted bark, sawdust, wood splinters, sand and other extraneous matter. It is recommended that the bark be washed and roughly handled or tumbled to remove sand and other loosely adhering matter for preventing undue wear of blowers and other processing equipment, as well as avoiding contamination of the bark fractions. For convenience in handling, and to provide for separation of particles of rotted bark and other extraneous matter, it is recommended that the bark be chopped or broken into pieces which may conveniently be fed to a hammer mill or other grinding apparatus. If purity of product is essential, the bark may be screened prior to delivery to the grinding apparatus, the screen openings being selected to pass smaller particles of rotted bark, sawdust and other impurities, as well as sand loosened by the chopping or breaking action, the quality and uniformity of the final product being improved in relation to the cleanness of the bark delivered to the grinding apparatus.

Grinding is accomplished as, for example, in a hammer mill equipped with a screen for converting the bark into a substantially uniform mass of bark particles. The product of the hammer mill is a mass of bark particles of fairly uniform size and consisting approximately of the same constituents which compose the whole bark, although some of the phloem constituents will be found to be finely comminuted during the grinding operation. The purpose of this step is to produce increments or matrices of such size as to permit rapid adjustment of their moisture content, in order that friability of these matrices may be controlled during subsequent operations.

The ground bark may be exhausted into a collection chamber by means of a blower connected into the discharge from the grinder, the collection chamber preferably being of the type commonly known as a cyclone wherein the stream of air generated by the blower is separated from the flow of bark particles and exhausted to atmosphere.

It is the teaching of this invention that, after conversion of the whole bark slab into a substantially uniform mass of bark particles, as in the grinding step, further comminution of the bark be performed at a reduced but controlled moisture content in order that the friability of the bark may suitably be adjusted to enhance differential pulverization of the several bark constituents and destruction of the bond therebetween. It has been discovered that the phellem or cork fraction may most easily be separated from the bark matrix by a comminuting process carried on at a moisture content above 15%. Below 15% the yield of cork, as easily separated larger particles, drops off rapidly, whereas the sieve tubes become increasingly friable, producing an increasing yield of bark powder and similarly increasing yield of bast fibers or stone cells as the residue of the bark matrix, the bast fibers being highly and increasingly resistant to comminuting action as their moisture content is reduced. The gist of the invention is to be found in a method of treating bark comprising the steps of initially grinding the bark at a high moisture content, and thereafter drying the bark for progressively controlling the friability of the bark matrices so that selective separation of the several bark fractions may be obtained in a continuous process.

In one form of apparatus for practicing the invention, reduction of moisture content of the bark matrices produced by the hammer mill is accomplished by conveying the ground bark by means of a stream of heated air. The contact of heated air with the surfaces of the bark particles conveyed thereby results in controlled evaporation of the moisture contained in the bark, the temperature and rate of flow of the air being so adjusted as to accomplish a reduction in the moisture content of the bark particles to the order of 15% to 25%, based on the dry weight of the bark. In an apparatus in which the drying step is accomplished by means of a heated air stream, the bark may preferably be discharged into a second collection chamber of the cyclone type, in which the bark particles are subjected to a vertical action for separating the bark from the moist air and from which the air is discharged to atmosphere.

At this point in the process the ground bark particles may be delivered onto a vibrating screen or to other type of separator for separating therefrom any finely pulverized material which may have been produced thus far in the process. In the event a screen is employed, it may suitably be a single deck Hummer screen having a 48 mesh (0.0116" diameter openings) screen. The minus-48 mesh material recovered by this screen is identified herein as bark powder, and is conveyed to a place of storage or to apparatus for subsequent treatment, as may be desired. For example, for certain uses it is desired that the bark powder be further pulverized, and the bark powder fraction intended for such uses is delivered to a micropulverizer for that purpose. The plus-48 mesh material is subjected to a controlled pulverizing action as in a ball mill, the moisture content of the material being fed to the ball mill being preferably 15% to 25%, depending upon the quality of the product to be recovered. The rate of treatment in the ball mill is in part determined by the moisture content of the material being fed to the mill.

As is indicated hereinabove, the cork fraction of the bark may be disengaged from the bark matrix at a relatively high moisture content, whereas complete disengagement of the intermediate fraction is accomplished only after a prolonged and severe pulverizing action, which may be shortened in time only by reduction in moisture content of the matrices below that at which the cork particles are disengaged. The sieve tubes and other portions of the phloem, exclusive of the bast fibers or stone cells, having been disengaged from the other constituents which originally comprised the bark matrix, are finely comminuted by action of the ball mill, the rate of yield of a minus-48 mesh fraction, herein identified as bark powder, increasing steadily, but at the expense of purity, as the moisture content is lowered.

The product discharged from the ball mill is fed directly to separating apparatus arranged in series, as, for example, onto a series of Tyler Hummer vibrator screens, the first of these screens being a single deck 48 mesh screen similar in all respects to the screen onto which the ground and partially dried bark is delivered from the second collection chamber. The minus-48 mesh product separated by this screen is conducted to the place of storage or to subsequent treating apparatus together with the separated product recovered by the previous screen. The plus-48 mesh material may be delivered over second and third screens in this series, the second screen being a 14 mesh (0.046" diameter opening) screen, and the third screen being a 28 mesh (0.0232" diameter opening) screen. The fractions recovered as the product passes over the second and third screens are designated "plus-14" and "plus-28," these two fractions consisting largely of cork, the minus-28-plus-48 mesh material (product 26) consisting largely of the bast fibers or stone cells which comprise the intermediate fraction.

The following table is indicative of the yield to be had from the bark of Douglas fir trees having an average cork content:

Table

| Material | Moisture Content, per cent | Pounds | Yield, per cent total |
| --- | --- | --- | --- |
| Raw Bark Chips | 50-80 | 2,418 | |
| #1 +14 mesh } cork (products 24 plus 25) #2 +28 mesh | 22 20 | 81 297 | 4 15 |
| #3 +48 mesh, Intermediate (product 26) | 19 | 364 | 18 |
| #4 -48 mesh, bark powder (products 18 plus 21) | 17 | 1,279 | 63 |
| | | 2,021 | 100 |

It will be noted that the recovered fractions total 2021 pounds, indicating a loss of approximately 16%, based on the weight of the raw material. It is believed that this loss may partially be accounted for by the evaporation of water from the bark during the processing steps.

Applicant's method of treating bark is illustrated on the accompanying drawing illustrating a flow chart in which the circle 10 represents natural whole bark in the condition in which it is received at a bark plant. The bark 10 is separated easily from spring and summer cut logs, and a stock pile of bark may be accumulated without the necessity of using a rossing machine or the like for stripping the bark from the log. Since the bark may often be taken from logs which are floated to the mill, further washing or tumbling of the bark may be wholly unnecessary. Moreover, the bark received at the bark plant may be broken sufficiently to be fed directly to the hammer mill for the initial grinding step. For these reasons, the drawing illustrates the invention as a process which commences with the product, bark, which may be subjected to a grinding action as the first step 14 of the process. Alternatively, the bark may be subjected to a washing or tumbling action, indicated at 11, and may be chopped or suitably broken up, as at 12, and screened to eliminate rotted bark, sawdust and other impurities, according to the condition in which it is received at the plant. The screening step, from which the "overs" are delivered to the hammer mill, is indicated at 9. It will be understood, however, that the washing or tumbling and chopping and screening steps may be omitted, as is indicated by the line 13.

In the drawings the initial grinding step is indicated at 14, and the initial drying step at 15, after which the ground and partially dried bark may be subjected to a screening or other separating action, as indicated at 16, for the recovery of finely comminuted material 18 which may have been produced thus far in the process. The residual material is subjected to a comminuting action at 19, or the separating step 16 may be omitted from the process and the entire product of the drying step be further comminuted as is indicated by the line 17.

The product of the comminuting step 19 is separated at 20 to recover finely comminuted material 21, and the residue is further separated at 22 and 23 to recover cork fractions 24 and 25 and fiber or stone cells 26. The minus 48 mesh material, or any portion thereof, may be fed to a micro-pulverizer 27 or other apparatus for subsequent treatment, as desired.

No limitation is intended by reference to a particular type of apparatus for practicing the method of the invention, the scope of the invention being determined solely by the breadth and scope of the appended claims. For example, in place of the screens described herein as being employed for separating the bark fractions, centrifugal separating means may be used wherein the bark fractions are caught in a vortex of gaseous media, such as air, and are separated therefrom according to their specific gravities and particle size and the action of centrifugal and centripetal forces.

Having now described my invention and in what manner the same may be used, what I claim as new and desire to protect by Letters Patent is:

1. The method of treating bark for the production of cork, fiber and bark powder, which comprises grinding said bark to provide an aggregate of bark matrices of not to exceed a predetermined size and consisting essentially of the several constituents of the whole bark, adjusting the moisture content of said matrices to a value not substantially less than 15% nor more than 25%, based on the weight of the dry bark, disuniting fiber bundles, cork and the non-fibrous portion of the phloem, finely comminuting the non-fibrous portion of the phloem, and reducing the fibrous portion of the phloem to ultimate fibers without substantial comminution of the cork and individual fibers, for promoting selective segregation of the cork, ultimate fibers and finely comminuted portion of the phloem.

2. The method of treating bark for the production of cork, fiber and bark powder, which comprises selecting bark having a moisture content of not substantially less than 30% nor more than 80% based on the weight of the dry bark, grinding said bark to provide an aggregate of bark matrices of not to exceed a predetermined size, adjusting the moisture content of the bark matrices to a value at which, in a subsequent comminuting step, a cleavage is effected between the several constituents of the bark, subjecting said matrices to a comminuting action to accomplish substantial reduction in particle size of the non-fibrous constituents of the phloem, disuniting fiber bundles, cork and the non-fibrous portion of the phloem, and reducing the fibrous portion of the phloem to ultimate fibers without substantial comminution of the cork and individual fibers, for promoting selective segregation of the cork, ultimate fibers and finely comminuted portion of the phloem.

3. The method of treating bark for the production of cork, fiber and bark powder, which comprises selecting bark having a moisture content of a value to promote comminution to an aggregate of bark matrices of not to exceed a predetermined size and consisting essentially of the several constituents of the whole bark, grinding said bark to provide an aggregate of bark matrices of not to exceed said predetermined size, adjusting the moisture content of the bark matrices to a value at which, in a subsequent comminuting step, a cleavage is effected between the several constituents of the bark, disuniting fiber bundles, cork and the non-fibrous portion of the phloem, finely comminuting the non-fibrous portion of the phloem, and reducing the fibrous portion of the phloem to ultimate fibers without substantial comminution of the cork and individual fibers, for promoting selective segregation of the cork, ultimate fibers and finely comminuted portion of the phloem.

4. The method of treating bark for the production of cork, fiber and bark powder, which comprises selecting bark having a moisture content of a value not substantially less than 30% nor more than 80% based on the weight of the dry bark to promote comminution to an aggregate of bark matrices of not to exceed a predetermined size and consisting essentially of the several constituents of the whole bark, grinding said bark to provide an aggregate of bark matrices of not to exceed a predetermined size, adjusting the moisture content of said matrices to a value not substantially less than 15% nor more than 25%, based on the weight of the dry bark, disuniting fiber bundles, cork and the non-fibrous portion of the phloem, finely comminuting the non-fibrous portion of the phloem, and reducing the fibrous portion of the phloem to ultimate fibers without substantial comminution of the cork and individual fibers, for promoting selective segregation of the cork, ultimate fibers and finely comminuted portion of the phloem.

5. The method of producing cork, fiber and bark powder from the barks of trees comprising grinding said bark to provide an aggregate of bark matrices of not to exceed a predetermined size, adjusting the moisture content of the bark matrices to a value at which, in a subsequent comminuting step, a cleavage is effected between the several constituents of the bark, disuniting fiber bundles, cork and the non-fibrous portion of the phloem, finely comminuting the non-fibrous portion of the phloem, reducing the fibrous portion of the phloem to ultimate fibers without substantial comminution of the cork and individual fibers, and selectively segregating the ultimate fibers, particles of cork and the finely comminuted phloem.

6. The method of producing cork, fiber and bark powder from the barks of trees comprising grinding said bark to provide an aggregate of bark matrices of not to exceed a predetermined size, adjusting the moisture content of said matrices to a value not substantially less than 15% no more than 25%, based on the weight of the dry bark, disuniting fiber bundles, cork and the non-fibrous portion of the phloem, finely comminuting the non-fibrous portion of the phloem, reducing the fibrous portion of the phloem to ultimate fibers without substantial comminution of the cork and individual fibers, selectively segregating the cork, individual fibers and finely comminuted non-fibrous portion of the phloem.

HERMAN W. ANWAY.

REFERENCES CITED

The following references are of record in the file of this patent:

UNITED STATES PATENTS

| Number | Name | Date |
|---|---|---|
| 1,870,166 | Bond | Aug. 2, 1932 |
| 1,274,728 | McCoy | Aug. 6, 1918 |
| 1,870,166 | Bond | Aug. 2, 1932 |
| 2,175,484 | Rees | Oct. 10, 1939 |
| 1,771,477 | Alton | July 29, 1930 |
| 2,286,643 | Phillips | June 16, 1942 |
| 2,319,182 | Vander Ryl | May 11, 1943 |
| 1,455,762 | Howard | May 15, 1923 |
| 1,797,901 | Darling | Mar. 24, 1931 |

FOREIGN PATENTS

| Number | Country | Date |
|---|---|---|
| 420,447 | France | Feb. 4, 1890 |

OTHER REFERENCES

Industrial and Engineering Chemistry, Aug. 1944 (pp. 759–764), 106—163.

Wise-Wood Chemistry, Reinhold Pub. Co., New York, 1944 (pp. 9–10).

"Profitable Use of Testing Sieves", 1940 edition, catalogue 53 of W. S. Tyler Co., Cleveland, Ohio, pp. 40 and 42, 209—237.

Handbook of Ore Dressing, by Taggart, 1927 edition, John Wiley & Sons Publishers, p. 1184. (Copy in Div. 25.)